United States Patent
Okada

[19]

[11] Patent Number: 6,092,014
[45] Date of Patent: Jul. 18, 2000

[54] VEHICLE DRIVING CONDITION PREDICTION DEVICE, WARNING DEVICE USING THE PREDICTION DEVICE, AND RECORDING MEDIUM FOR STORING DATA FOR PREDICTION

[75] Inventor: Akio Okada, Mishima, Japan

[73] Assignee: Toyota Jidosha Kabushiki Kaisha, Toyota, Japan

[21] Appl. No.: 08/892,178

[22] Filed: Jul. 14, 1997

[30]     Foreign Application Priority Data

| Jul. 15, 1996 | [JP] | Japan | 8-184355 |
| Aug. 29, 1996 | [JP] | Japan | 8-228880 |
| May 21, 1997 | [JP] | Japan | 9-130815 |

[51] Int. Cl.$^7$ ............... G01C 21/00; G08G 1/0968
[52] U.S. Cl. ............... 701/70; 701/208; 340/438
[58] Field of Search ............... 701/208, 70, 72, 701/93, 1, 213; 340/438, 441, 460

[56]                  References Cited

U.S. PATENT DOCUMENTS

| 5,335,176 | 8/1994 | Nakamura | 364/424.055 |
| 5,539,397 | 7/1996 | Asanuma et al. | 340/901 |
| 5,546,311 | 8/1996 | Sekine | 364/449 |
| 5,661,650 | 8/1997 | Sekine et al. | 701/82 |
| 5,748,476 | 5/1998 | Sekine et al. | 701/93 |
| 5,832,400 | 11/1998 | Takahashi et al. | 701/53 |

FOREIGN PATENT DOCUMENTS

| 0 543 543 | 5/1993 | European Pat. Off. . |
| 44 38 662 | 5/1995 | Germany . |
| 4-184215 | 7/1992 | Japan . |
| 4-351913 | 12/1992 | Japan . |
| 5-141979 | 6/1993 | Japan . |

OTHER PUBLICATIONS

Tamura et al: "A Study of Self-reliant Cornering Speed Control System", The 2nd Transportation and Logistics Conference, No.930–81, Jun. 9, 1993, pp. 178–183.

*Primary Examiner*—Michael J. Zanelli
*Attorney, Agent, or Firm*—Pillsbury Madison & Sutro LLP

[57]                  ABSTRACT

A vehicle driving condition prediction device, a warning device using this prediction device, and a recording medium for storing data for prediction, wherein during use of the prediction function of an approach speed of the vehicle to a curve ahead, the acceleration at the present moment is maintained for a condition maintaining period of time, and thereafter the vehicle speed is slowed down at a fixed deceleration, and using such an assumed deceleration pattern a vehicle speed in future is predicted, by which a warning can be given taking the chances of driver's deceleration into consideration, and wherein by storing data on road cants in a data base, and using cant data, it is possible to predict the lateral acceleration more accurately.

25 Claims, 7 Drawing Sheets

VEHICLE DRIVING CONDITION PREDICTION DEVICE, WARNING DEVICE USING THE PREDICTION DEVICE, AND RECORDING MEDIUM FOR STORING DATA FOR PREDICTION

BACKGROUND OF THE INVENTION

1. Field of the Invention

The present invention relates to a vehicle driving condition prediction device for predicting the lateral acceleration which will occur when passing through a curve ahead, and to a vehicle driving condition warning device for producing a warning when a predicted lateral acceleration exceeds a specified reference value. The present invention also relates to a recording medium for storing data for prediction and an operation program.

2. Description of Related Art

Well known automobile navigation systems provide route guidance for the driver of a vehicle. The navigation system is installed in an increasing number of vehicles. The navigation system stores road map data, including road shapes and monitors the position of the vehicle. Therefore, the system can recognize curves in the pathway of the vehicle. It has been proposed to optimize the vehicle speed when going into a curve using the navigation system. For example, Japanese Patent Laid-Open Publication No. 5-141979 (JP-A-05141979), teaches calculating lateral acceleration G while driving through a curve from the radius of curvature R of the curve ahead and the present vehicle speed, and comparing G to a predetermined reference value $G_O$. If the lateral acceleration G exceeds the reference value $G_O$, the system decides that the vehicle should be slowed down, and issues a warning.

As the driver reduces the speed in response to the warning, the vehicle speed entering the curve can be optimized, so that the vehicle can pass through the curve stably.

However, problems exist with the present warning systems. The curve warning issues even when the vehicle is travelling at a safe speed. Furthermore, a warning tends to issue unnecessarily because the driver plans to reduce the speed of the vehicle according to the driver's normal driving pattern.

SUMMARY OF THE INVENTION

In order to solve the deficiencies in the prior art discussed above, there is provided a vehicle driving condition prediction device for predicting the lateral acceleration of the vehicle which will occur when the vehicle travels through a curve ahead. The device comprises:

a vehicle speed sensor for detecting a speed of a vehicle;

a data base containing data on road curvatures and road cants as data related to future road conditions along the traveling direction of the vehicle; and a processing unit for predicting the lateral acceleration of the vehicle in a curve in the future pathway of the vehicle, from the vehicle speed detected by the vehicle speed sensor, and the road curvature and cants read from the data base.

The lateral acceleration when traveling through a curve can be predicted basically from the running speed of the vehicle and the curvature of the curve. However, the road curve generally includes a cant which reduces the lateral force on the tires. Whether it is possible to turn through a curve stably or not is evaluated by comparison between the frictional force of the tire with the road surface at the transverse section of the pavement, and the road-surface-direction component of the centrifugal force of the vehicle. Therefore, by taking the road longitudinal slope into consideration, more suitable conditions by which to issue a warning can be set.

Preferably, the above-mentioned data base includes data on road curvatures and cants as data related to discrete points of the road on which the vehicle will travel. Data such as these items can be provided readily as digital data, and can be stored easily on a CD-ROM, for example.

Preferably, the data base further includes data on longitudinal slopes as data related to the discrete map mentioned above. By using this longitudinal slope data in estimation of the vehicle speed, a more accurate vehicle speed can be estimated.

Preferably, in the present invention, the above-mentioned processing unit predicts the vehicle speed while traveling through a curve ahead as a function of time which takes the detected present vehicle speed and an assumed acceleration/deceleration pattern into consideration, and further predicts the lateral acceleration as a function of time from the predicted vehicle speed. For example, by using an assumed acceleration/deceleration pattern, in which conditions are set so that the present acceleration or deceleration is maintained for a predetermined period of time, the vehicle speed in the short-term future can be predicted by taking the present driving condition into consideration. By this arrangement, a suitable running speed in a curve ahead can be predicted.

The present invention is also characterized in that the prediction of the lateral acceleration by the processing unit is to predict the maximum lateral acceleration through the whole curve ahead, and that a warning is issued to the driver when the predicted maximum lateral acceleration exceeds the specified reference value.

When the maximum lateral acceleration is higher than the reference value, it is predicted that safe driving cannot be achieved. By warning the driver to decrease the speed at a point in time under the prediction, the vehicle speed when entering a curve can be decreased and the driver can drive safely through the curve.

The present invention also employs a recording medium to record or store data on road curvatures and cants as data related to discrete points in the advancing direction of the vehicle.

The present invention also records longitudinal slope data on the above-mentioned medium as data related to the above-mentioned discrete points along the road.

The recording medium described above can be used appropriately as a data base in the vehicle driving condition prediction device and the warning device in which the prediction device is installed.

The present invention also stores a program for operating the vehicle driving condition prediction device on a recording medium to predict the lateral acceleration of the vehicle which will occur when passing through a curve ahead. The program causes the vehicle driving condition prediction device to receive the vehicle speed detected by the vehicle speed sensor. The program also causes the prediction device to receive the road curvature and cant of a curve ahead from the data base including data on curvatures of curves and data on road cants related to various map points ahead along the road and to predict the lateral acceleration of the vehicle in a curve that the vehicle will enter from input data on the vehicle speed, the curvature of the curve, and road cant.

DETAILED DESCRIPTION OF THE INVENTION

A preferred embodiment of the present invention will be described with reference to the accompanying drawings.

Figure 1:
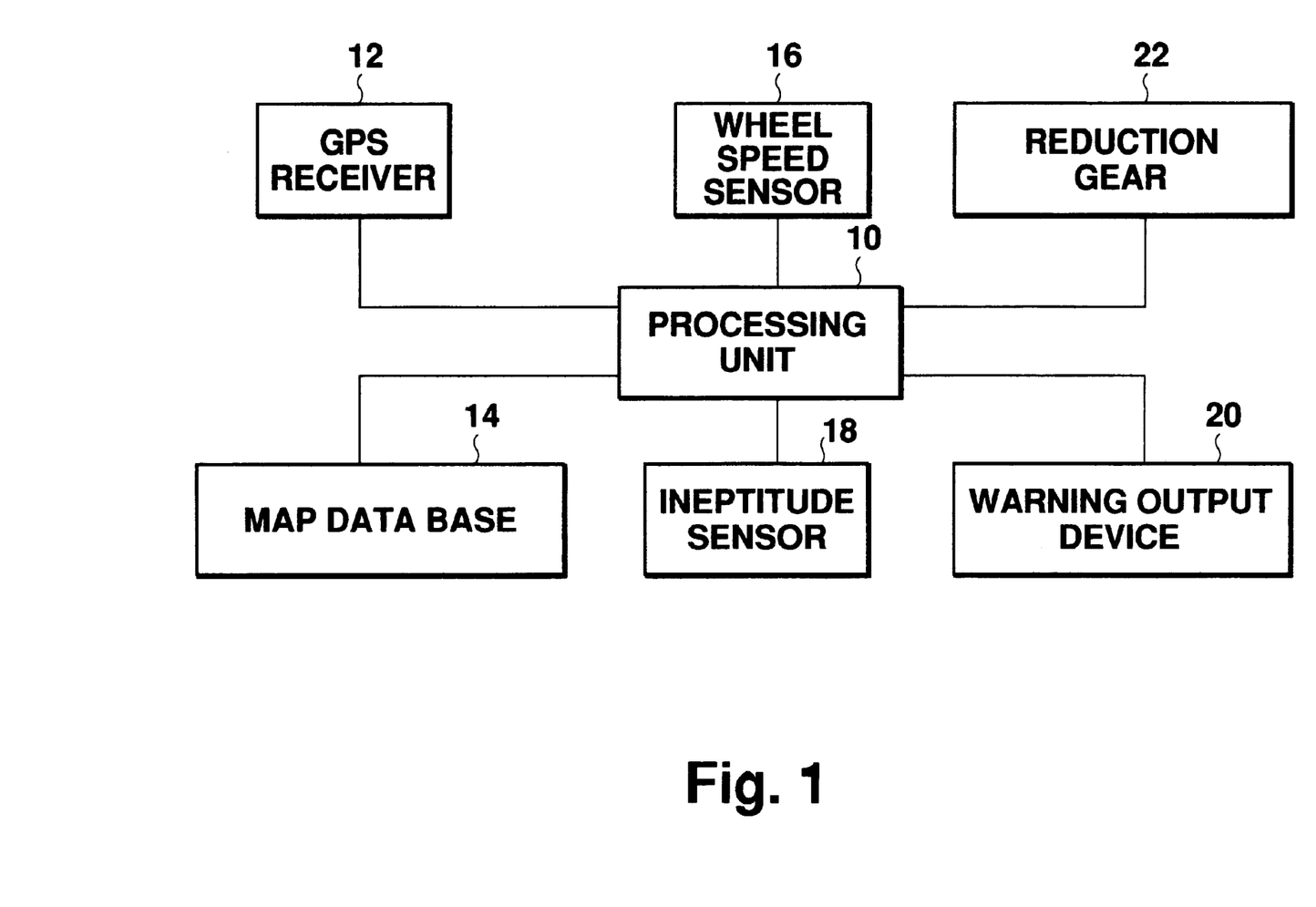
FIG. 1 is a block diagram showing the general composition of an embodiment of the present invention.

FIG. 1 is a block diagram showing the operation support device according to the present invention. A processing unit 10 performs arithmetic operations on various kinds of input signals and outputs various control signals.

A GPS receiver 12 receives radio waves from satellites and performs a GPS (Global Positioning System) process to detect the present position of the vehicle, and sends a present position signal to the processing unit 10. This embodiment utilizes DGPS (Differential GPS) to receive error GPS information by FM multiplex broadcasting to improve the accuracy of present position detection. Accordingly, it is possible to detect the present position of the vehicle with an accuracy of 2 to 3 meters or less.

A map data base 14 includes map information for ordinary navigation. This map data base 14 includes X and Y coordinates, curvatures of curves, road surface cants and longitudinal slopes of specified map points (at proper intervals on the road). The map database 14 also includes a flag which is triggered when slowdown is required at respective points, which may be due to unsafe driving conditions such as wet road surfaces. The map data base 14 supplies the processing unit 10 with those items of data as functions of the present and future position of the vehicle.

A wheel speed sensor 16 detects the rotation of the drive axle by an optical or magnetic method, and generates pulse signals according to the number of revolutions of the wheels. In this example, the wheel speed sensor 16 detects the number of revolutions of the left and right front wheels, respectively. The processing unit 10 detects state quantities of vehicle movements, such as the vehicle speed and acceleration from output of the wheel speed sensor 16. It is preferable for an acceleration sensor to be provided separately for longitudinal and lateral acceleration. It is also preferable to check the accuracy of each sensor as well as results of arithmetic operations and to make corrections when necessary.

An unsafe driving condition, or ineptitude sensor 18 comprises a rain drop sensor, a wiper switch, and an image pickup device, and supplies the processing unit with a flag representing the level of unsuitable driving conditions in terms of the dampness of the road surface as well as other unsafe road conditions.

The processing unit 10 predicts the vehicle speed, position lateral acceleration, and so on at instants in the near future from the road shape, present position, vehicle speed, and so on. Note that the processing unit 10 uses the unsuitable driving conditions flag for control of the lateral acceleration.

The processing unit 10 is connected with a warning output device 20, and a reduction gear 22. The warning output device 20 includes a speaker for sound output, a buzzer, an LED (light emitting diode), a display or the like, and outputs a warning directing the driver to decelerate. The display also presents information for navigation. The reduction gear 22 includes a throttle actuator, a speed change actuator, a break actuator, etc. to control the deceleration of the vehicle.

Figure 2:
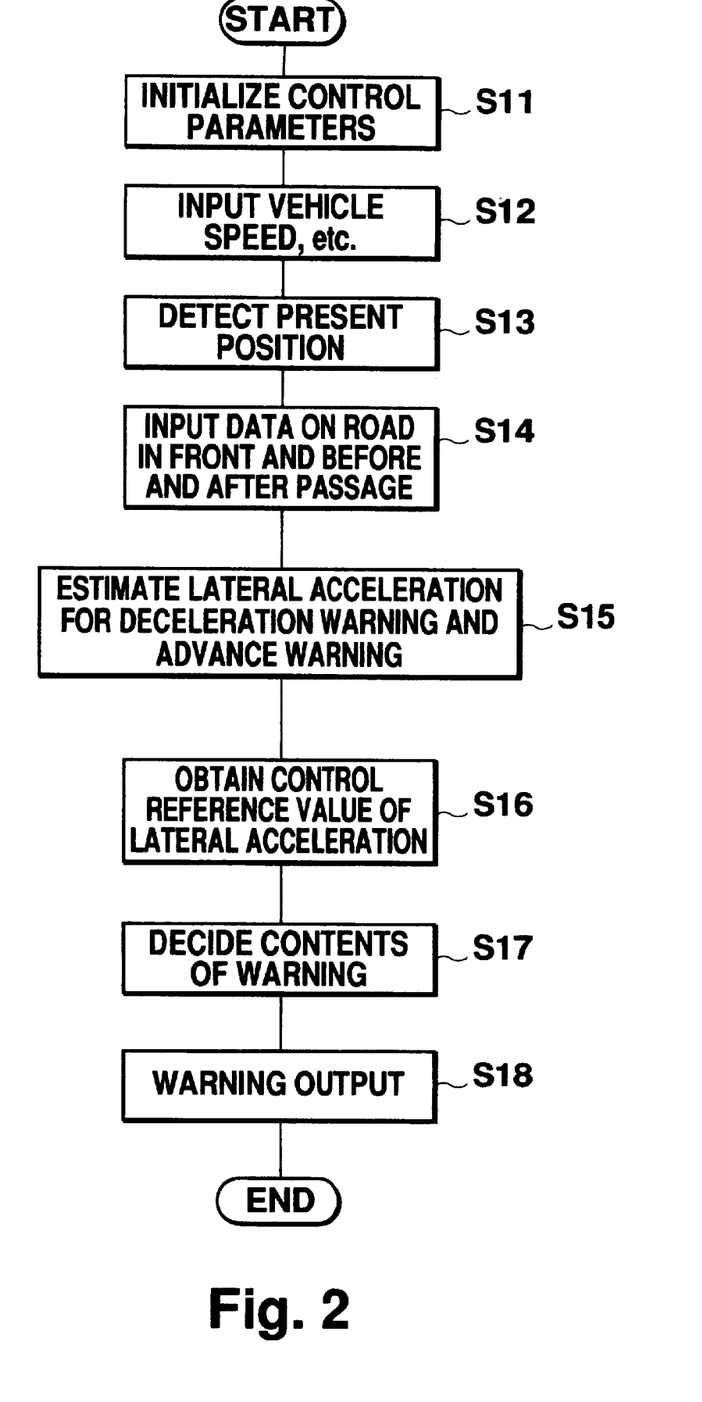
FIG. 2 is a flowchart showing the processing of warning the driver.

The procedure for producing warning output in this embodiment will be described with reference to FIG. 2. When the engine is started, the processing unit 10 is activated and begins processing.

The processing unit 10 sets various control parameters (flags) to initial values (S11), then receives vehicle state quantities from the wheel speed sensor 16 (S12) and the present position from the GPS receiver 12. (S13) The processing unit 10 also receives information about present position and data on the shape of the road in front of the vehicle from the map data base 14. (S14)

If the present vehicle condition and the shape of the road ahead are obtained, a lateral acceleration is hereafter predicted for an advance warning and a warning directing the driver to decelerate. (S15) Calculation of the lateral acceleration will be described later. Next, a lateral acceleration which would allow stable driving at each point on the road is calculated, that is to say, a control reference value as the basis for control. (S16) The control reference value is decided by the frictional force between the road surface and the tire. As will be discussed later, the control reference value is corrected according to the paved condition of the road and the clear visibility ahead stored in the map data base 14 and the dampness of the road surface obtained by the unsafe driving condition sensor 18.

The control reference value of the lateral acceleration is compared with the predicted lateral acceleration obtained for an advance warning and a warning to direct the driver to decelerate, and a decision is made about the necessity of an advance warning and a warning for deceleration, as well as the kind of warning to be issued. (S17) The processing unit 10 controls the warning output device 20 and the reduction gear 22 to output the decided warning(S18).

Description will now be given of the prediction of lateral acceleration in S15. The processing unit 10 receives state quantities of the vehicle movements, such as present vehicle speed, individual wheel speeds, individual wheel accelerations, and so on through the wheel speed sensor 16 from the vehicle side, and receives longitudinal slope data from the map database 14. From those items of data and the assumed deceleration pattern that simulated the deceleration behavior of the particular driver, future vehicle movements (vehicle speed and position) are predicted by solving an equation of motion.

Figure 3:
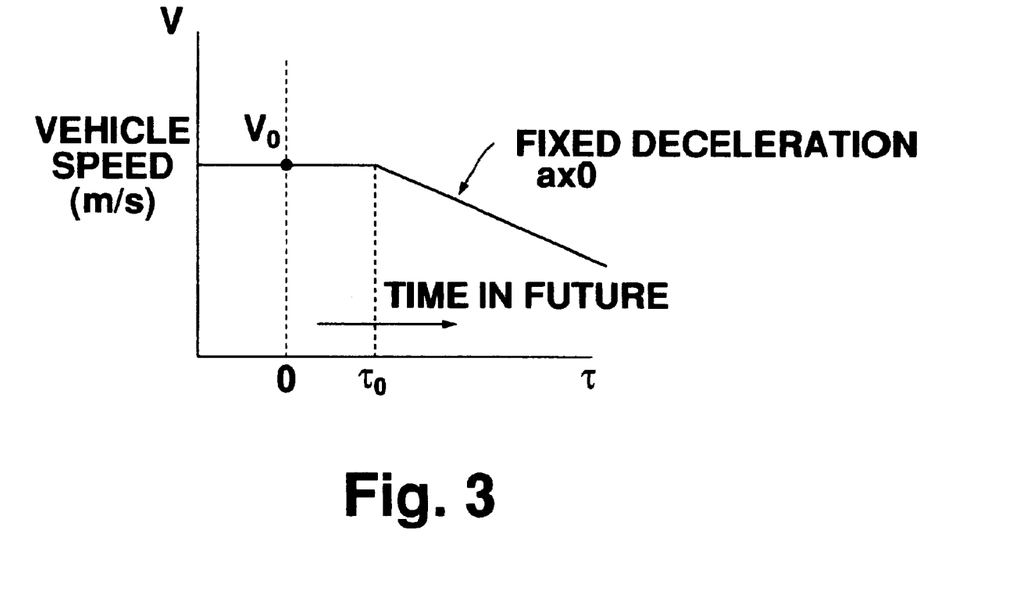
FIG. 3 is a diagram showing an example of an assumed deceleration pattern.
Figure 4:
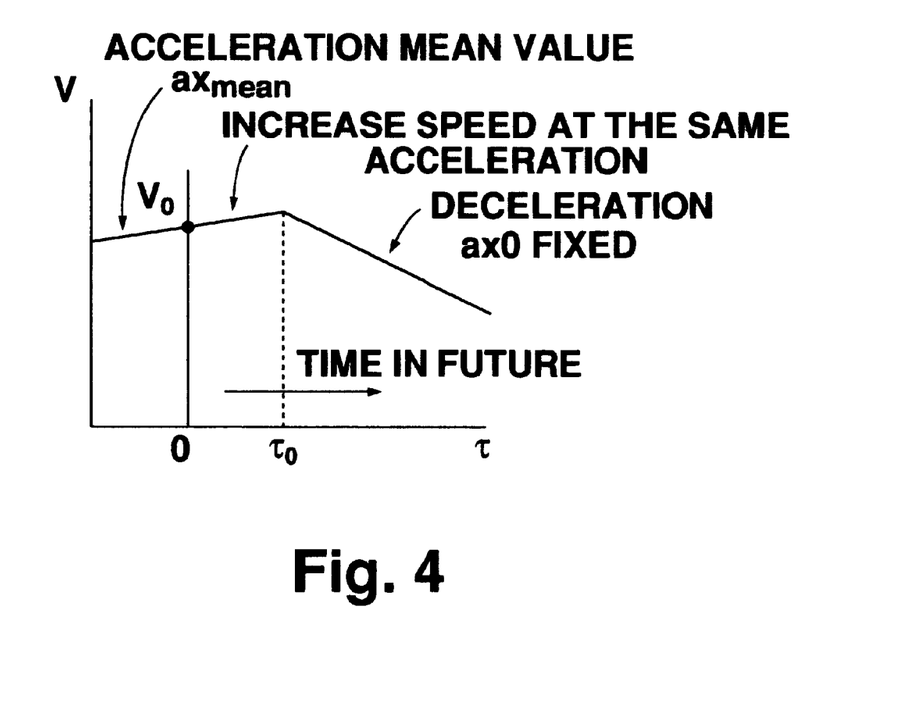
FIG. 4 is a diagram showing another example of an assumed deceleration pattern.
Figure 5:
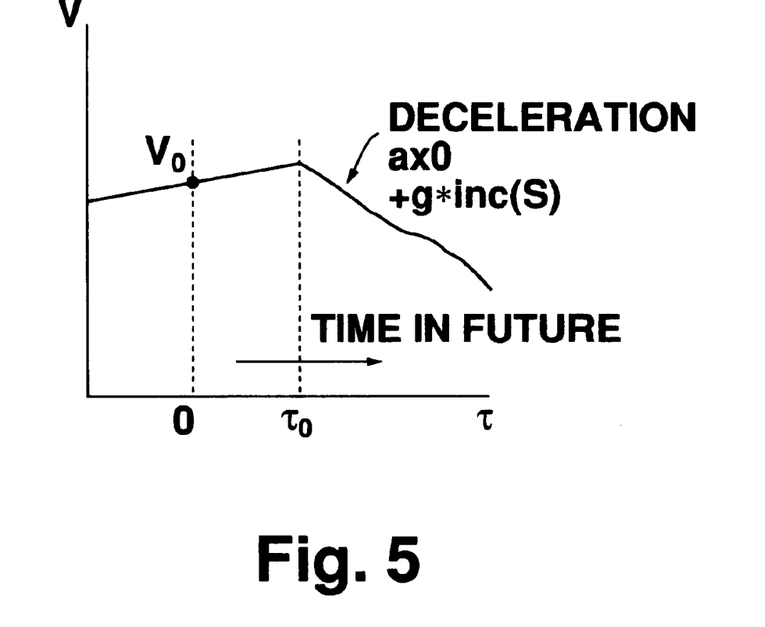
FIG. 5 is a diagram showing yet another example of an assumed deceleration pattern.

The assumed deceleration pattern is first explained. The assumed deceleration pattern supposes that the present acceleration or deceleration state is maintained for a period of τ0 sec from this very moment, and after τ0 the brake is applied to decelerate the vehicle at a fixed deceleration ax0. This example is illustrated in FIGS. 3 to 5. FIG. 3 illustrates where the vehicle is running at a fixed speed of V0, and for a period of τ0 from this very moment the vehicle runs at the same speed, then the vehicle is slowed down at a fixed deceleration of ax0. This ax0 has only to be set at 0.2 G or so, for example, and may be changed if it is necessary.

FIG. 4 shows a case where at this very moment the vehicle is being accelerated at a mean value of acceleration of $ax_{mean}$. In this case, acceleration is continued at $ax_{mean}$ until τ0, and thereafter, the vehicle is decelerated at ax0.

FIG. 5 shows a case where acceleration at this very moment is $ax_{mean}$ like in FIG. 4, and takes the longitudinal slope inc (S) into consideration, in which case S denotes a distance in the advancing direction of the vehicle from the present position, inc(S) denotes the inclination at each position on the road, and g denotes the gravitational acceleration, so that g×inc(S) is the acceleration in the advancing direction of the vehicle at each point along the road.

If this assumed deceleration pattern is used, the vehicle speed V(τ) after τ sec from this moment and the moved distance S(τ) from the present position are obtained by solving the following differential equation. Suppose that in deceleration after τ0, a braking force Fb=m×ax0 is applied, if the mass of the vehicle is designated by m, regardless of the inclination.

$$\frac{d^2 S(\tau)}{d\tau^2} = ax_{mean} \quad (0 \leq \tau \leq \tau_0) \\ = -ax0 \quad (\tau_0 < \tau) \} \quad (1)$$

$$\frac{dS(\tau)}{d(\tau)} = V(\tau) \quad (2)$$

where $ax_{mean}$ denotes the mean vehicle speed for a period before t=0, and is calculated from a mean value of acceleration of the left and right front wheels. As mentioned above, ax0 is a fixed deceleration. The initial conditions of the above equation are V=V0 and S=0 when t=0.

When the road has a longitudinal slope, the inc(S) at every point along the road needs to be input, to obtain an equation of motion, and it is necessary to add g×inc(S) to the right-hand side of the above equation. Note that in a road division where τ≦τ0, the effect of the inclination is included in $ax_{mean}$. Therefore, only for a road division where τ>τ0, is it necessary to take the effect of the longitudinal slope into consideration. (Refer to FIG. 5.)

Figure 6:
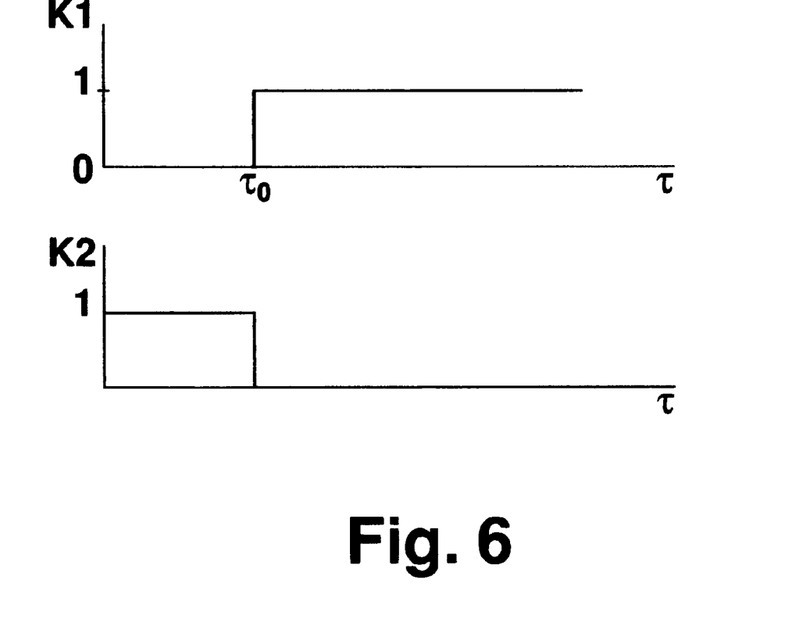
FIG. 6 is an explanatory diagram of weighting functions.

As weighting functions with respect to τ, K1 (τ) and K2 (τ) are defined by the following equations.

$K1(\tau)=0 (0 \leq \tau < \tau 0)$ $K1(\tau)=1 (\tau \geq \tau 0)$ $K2(\tau)=1-K1(\tau)$ K1 (τ) and K2 (τ) in the above equations are illustrated in FIG. 6.

Therefore, the equations (1) and (2) can be expressed as shown below.

$$\frac{d^2 S(\tau)}{d\tau^2} = K1(\tau) * ax_{mean} - K2(\tau) * ax0 - \\ K1(\tau) * g * inc(S) \quad (3)$$

$$\frac{dS(\tau)}{d\tau} = V(\tau) \quad (4)$$

By solving the equations (3) and (4), the vehicle speed V(τ) and the moved distance S(τ) according to the assumed deceleration pattern can be obtained.

In this embodiment, so as to be compatible with various deceleration models, the respective terms on the right-hand side of the equation (3) are multiplied by parameters FK1, FK2 and FK3 in advance. Consequently, if "1" is set for a certain parameter, that parameter is 100% taken into consideration, or if "0" is set, that parameter is disregarded completely.

As a result, it follows that the assumed deceleration pattern is expressed by five parameters, FK1, FK2, FK3, τ0, and ax0.

In view of the characteristics of ordinary drivers, approximate values which should desirably be set are FK1, FK2 and FK3=1.0, τ0=0.5–1.5 sec, and ax0=2–3 m/sec². However, by varying the values of the parameters according to the object of control and the various kinds of vehicles and individual driving patterns of drivers, suitable behavior of the vehicle can be predicted.

By solving the above equation of motion, obviously the vehicle is bound to come to a stop at a given time ahead, so that it is possible to stop calculation there and set V(τ)=0 and S(τ)=constant hereafter.

Figure 7:
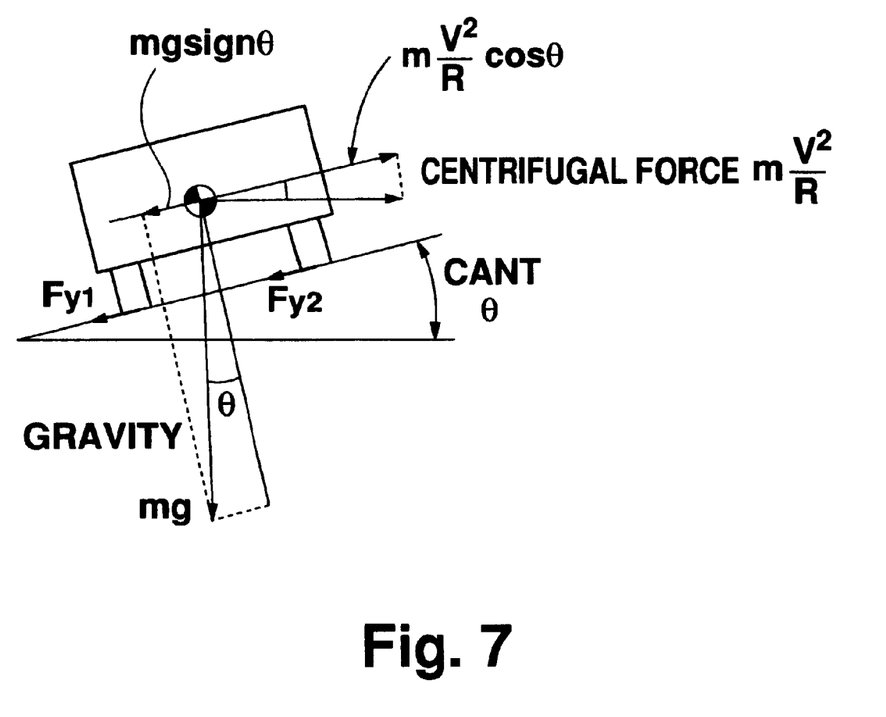
FIG. 7 is a diagram showing the balance of forces acting on the vehicle.

The balance of forces acting on the vehicle when turning through the curve with a cant is as illustrated in FIG. 7. Specifically, the centrifugal force acting on the vehicle is $mV^2/R$ (m is the mass of the vehicle, V is the vehicle speed, R is the curve radius (the curvature of 1/R is stored in the map data base)), and the cant is θ, and therefore the lateral force acting on the vehicle, Fy, (parallel with the road surface) is $m(V^2/R) \cos \theta - m g \sin \theta$.

Therefore, the lateral acceleration of the vehicle is expressed as $(V^2/R) \cos \theta - g \sin \theta$. If the roll angle attributable to the deflection of the suspension of the vehicle body is neglected, this corresponds to the reading of a lateral accelerometer and, in other words, corresponds to the lateral acceleration that the driver feels.

If this lateral acceleration is designated by ayh (τ) as a function of τ, the ayh (τ) is expressed as $$ayh(\tau) = (V^2(\tau)/R(\tau)) \cos\theta - g \sin\theta(\tau) \quad (5)$$

Meanwhile, the vertical drag N is expressed as $N = m(V^2/R) \sin\theta + m g \cos\theta$. Therefore, in order to turn through a curve, it is required for the following equation to hold.

$$\frac{F_Y}{N} = \frac{\frac{V^2}{R}\cos\theta - g*\sin\theta}{\frac{V^2}{R}\sin\theta + g*\cos\theta} \leq \mu \quad (6)$$

The left-hand side of this equation increases sharply as V increases, and there is a value of V such that the left-hand side=$\mu$. Therefore, if V is obtained by this equation supposing the left-hand side=$\mu$, this V is the maximum vehicle speed at which the vehicle can run through a curve, in other words, the critical vehicle speed.

In this case, the cant θ of the road surface is generally 0.1 rad (about 5.7°) or less, and the first term in the denominator is 1/10 or less of the second term. Therefore, the vertical draft (denominator) hardly changes with the vehicle speed. For this reason, the harshness of turning while driving through a curve can be substantially evaluated by the magnitude of the acceleration ayh of the numerator. To be more specific, as the value of the acceleration ayh approaches $\mu g$, turning becomes unstable. Therefore, the control reference value is set at a value sufficiently smaller than $\mu g$.

Whether it is possible to make a stable turn through a curve may be decided according to the maximum value of the lateral acceleration ayh (τ) regardless of a left turn or right turn. It is required that the maximum value of |ayh (τ)| does not exceed the control reference value for a road division as the object of measurement on the road ahead. Therefore, the maximum value ayhmax of |ayh (τ)| is obtained and taken as a basis on which to decide whether or not the vehicle is in a condition suitable for curve driving. A road division for measurement is a division of τmin≦τ≦τmax in terms of time or V0×τmin<τ=V0×τmax in terms of distance. This τmin and τmax are set at a suitable value based on survey by actual driving, and may be about 2 to 10 sec, for example.

Time τ0 for maintaining the present acceleration or deceleration is decided by considering the time required for the driver to switch over from the accelerator pedal to the brake pedal and so on. In this decision, the points on the road where the speed is reduced should be considered by recognizing the locations of the curves by actual driving on the road. Since the effect of the present driving condition at this very moment is limited up to a finite time τ0 as described above, assumed deceleration patterns based on reality for either the average ordinary driver or an individual driver's driving patterns can be provided.

Description is next given of setting a control reference value for comparison with ayhmax. As described above, to make a stable turn in driving through a curve, ayhmax must be limited to a sufficiently small value in accordance with the $\mu$ of the road surface. For example, in designing ordinary roads, ayhmax is limited to about 1.7–2 m/s².

In this embodiment, the control reference value is set using the two factors F1 and F2 into consideration.

An unsafe driving condition flag F1 is provided through comprehensive evaluation of the road width, the clear visibility of the road ahead, the unevenness of the road surface, the degree of pavement, and so on. Related data is collected from various points of the roads and stored in the map data base 14. When the conditions are good, F1=0 is set, and when the conditions are bad, F1=1 is set. Instead of evaluation of two stages described above, evaluation in multiple stages may be adopted.

In this embodiment, a flag F2 is set according to the dampness of the road surface detected by the unsafe driving condition sensor 18. This is because the friction coefficient $\mu$ of the road surface varies greatly according to the dampness of the road surface. Preferably, the setting of the unsafe driving condition flag is changed not only according to the dry or wet condition of the road but also according to snow, ice and so on. Information about the tires may also be detected. F2=0 is set when the condition is good, and F2=1 is set when the road condition is bad. For this flag, too, evaluation may be in multiple stages instead of two stages.

With regard to the friction coefficient $\mu$, if data on the roads when they are wet or dry are stored in the map data base 14, a value may be selected which corresponds to a signal from the unsafe driving condition sensor 18. Instead of storing the friction coefficients $\mu$ for each road, a table may be prepared which holds values decided by taking the paved condition of the road into consideration. For example, certain values may be assigned to an asphalt road considering whether the road is dry or wet, so that the friction coefficient $\mu$ depends on the paved condition of the road (stored in the map data base 14). Alternatively, the values of friction coefficient $\mu$ of the road on which the vehicle is traveling may be transmitted from the beacons on the road so that the driver can see the friction coefficient $\mu$ of the road by receiving a signal using communication equipment on the vehicle. The friction coefficient $\mu$ may be estimated from stored data on the behavior of the vehicle, such as skidding at the time of braking or acceleration in the past experience of the driver and/or vehicle. The friction coefficient $\mu$ may also be estimated from the self-aligning torque (the torque acting on the ground contact area of the tire in the direction of reducing the slip angle when the tire is rotating with a certain slip angle).

If an accurate value of the friction coefficient $\mu$ of the road surface is obtained, it becomes unnecessary to pay attention to the state of the unsafe driving condition flag relative to the friction coefficient $\mu$ of the road surface.

If the flags F1 and F2 were decided as described above, a flag F3 is decided by a combination of those flags.

TABLE 1

Definition of flag F3

| F2<br>F1 | 0 | 1 |
|---|---|---|
| 0 | 0 | 2 |
| 1 | 1 | 3 |

The flag F3 is provided for numerical representation of the unsafe road conditions by combining the two flags described earlier. The flag F3 is assigned a value of 0, 1, 2 or 3 as four combinations of states of flags F1 and F2.

By using the values of the flag F3, the value of control reference value ayhmax for lateral acceleration is varied. For example, when setting three parameters a1, a2, and a3 as control reference values for a deceleration insufficient warning, those parameters are varied according to the value of F3 to provide control reference values a1*, a2*, and a3*. The * indicates the value of the flag F3. For example, F3=1 when F1=1 and F2=0, and 1 is substituted for *, so that the reference values become a11, a21, and a31. In this way, the control reference values are varied according to the environmental conditions of the road and the vehicle.

Figure 8:
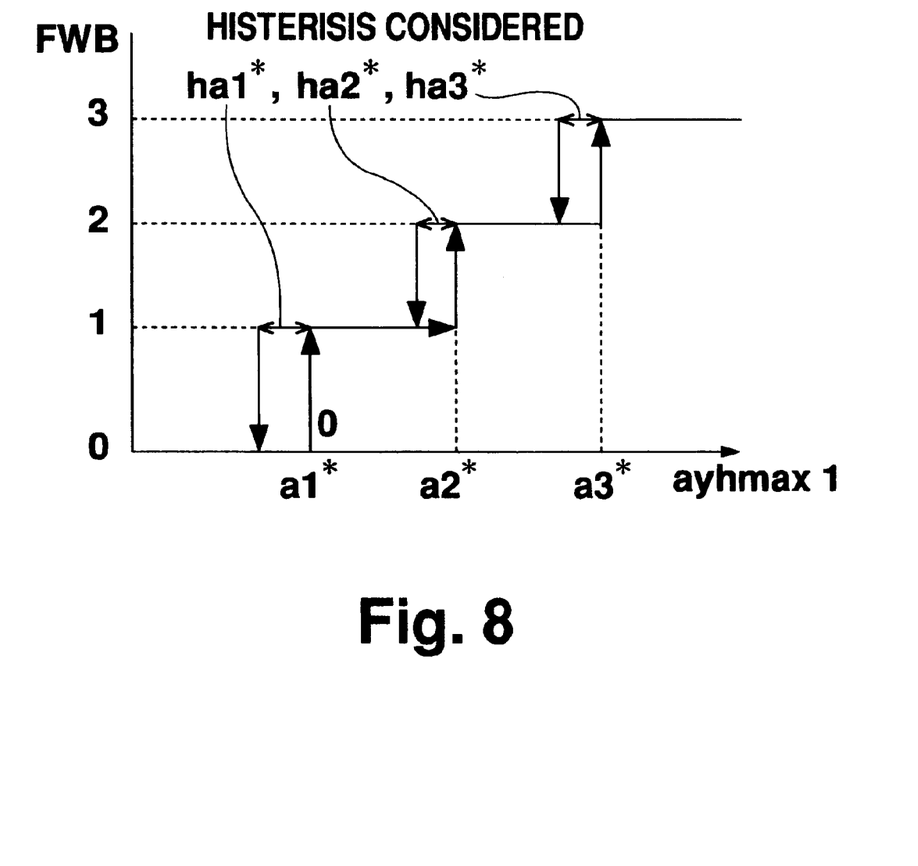
FIG. 8 is an explanatory diagram of a plurality of control reference values.

In the above operation, considering hysterisis, the three control reference values a1*, a2*, and a3* are differentiated in the increasing and decreasing directions as shown in FIG. 8. In other words, hysterises h1*, h2* and h3* are set to correspond to the control reference values a1*, a2* and a3*. By this setting, hunting in control equipment is prevented.

Figure 9:
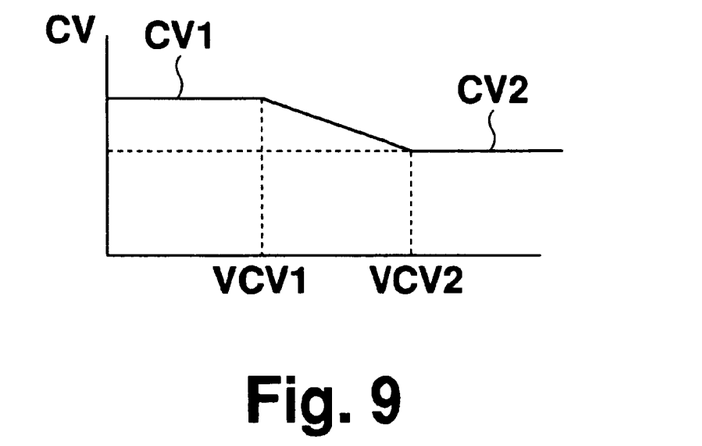
FIG. 9 is an explanatory diagram of an example of a weighting function.

As shown in FIG. 9, it is preferred that the control standard values are multiplied in advance by weighting functions CV (V) (less than 1). In FIG. 9, the weighting functions are as follows: CV1 up to vehicle speed VCV1, CV2 (smaller than CV1) from vehicle speed VCV2 and higher, and CV values decreasing linearly from CV1 to CV2 for vehicle speeds from VCV1 to VCV2. By this arrangement, the control reference value is decreased as the vehicle speed increases, and the decreased value may be used as the final control reference value. This is done to take into consideration the fact that at a higher vehicle speed, the variation in the lateral acceleration may be large even though changes in the vehicle conditions may be slight, i.e., small turns of the vehicle by the driver may still cause large lateral acceleration on the vehicle.

Description is next made of the decision of whether to produce a warning output. This decision is made according to whether or not ayhmax obtained by estimation mentioned above exceeds the set control reference value. In the example in FIG. 8, FWB=0 when ayhmax is a1* or less, FWB=1 when ayhmax is greater than a1*, FWB=2 when ayhmax is a2*, and FWB=3 when ayhmax is greater than a3*. By deciding the content of a warning according to the value of this flag FWB, a warning can be generated which corresponds to the instability of driving through a curve at the present vehicle conditions.

For example, possible kinds of warnings that can be given according to the value of the flag FWB are as follows.

FWB=0: Nothing is done.
FWB=1: primary warning by voice (only once)
FWB=2: secondary warning by voice ("Apply the brake" together with a buzzer sound)
FWB=3: third warning by voice (the same content as in the secondary warning with greater sound volume)

It is preferable that the warning is output by (i) warning by voice, (ii) buzzer, or (iii) turning on a lamp or LED, or a combination. It is also preferable that any plural n control reference values are provided and various warning means are combined.

Furthermore, deceleration control is preferably carried out by a combination of the following items of control. For example, deceleration control should be done when FWB=2 or 3.

(i) Throttle control (The throttle is closed for deceleration.);

(ii) Gear shift down in automatic transmission (AT) on a downhill slope (An abrupt shift down causes a sharp change in the tire slip ratio which is responsible for unstable behavior of the vehicle. Such deceleration control as absorbing the shock in gear change and stepless speed change is effective; and (iii) Control of brake pressure of front and rear wheels (In this case, automatic vehicle speed control by brake pressure is performed, regardless of whether or not the driver operates the brake.)

Desired deceleration control can be carried out by the methods as described.

In this embodiment, in addition to control by a warning just before entering a curve when deceleration is insufficient, an advance warning to urge the driver to slow down, which precedes a warning about forced deceleration by automatic control, is given a considerable distance before the curve.

In this case, the lateral acceleration is calculated as stated below, and a warning output is controlled by comparing the calculated acceleration with the control reference value.

The curvature roumax whose absolute value is greatest in a specific road division in front of the vehicle (for a time from tpmin sec to tpmax sec or a distance from tpmin×V to tpmax×V) and also the cantmax at that point on the road are obtained from data supplied from the map data base 14. A possible road division is a distance corresponding to about 2 to 9 sec., for example.

The assumed deceleration pattern, as shown below, is used. Specifically, the curve passing speed is assumed as $$Vp = (Fpv \times V) + (1 - Fpv \times Vc/3.6) \times Kv$$

where Fpv is a weighting function, and Fpv=1 if Fpv is assumed to be the present speed, and Fpv=0 if it is assumed that the vehicle passes the curve at the speed limit of that course, Vc is the speed limit (km/h) of the course, and Kv is a correction factor.

On the other hand, the lateral acceleration while turning, ayp, is expresses as $$ayp = roumax \times Vp^2 - g \times cantmax$$

This equation also takes the turning direction (to left or right) into consideration.

For example, if Vc=50 km/h at Fpv=0.5 and Kv=1.0, when the vehicle is driving at a speed of 70 km/h, it follows that an assumption is made that the vehicle will enter the curve at a vehicle speed corresponding to Vp=60 km/h. With respect to this condition, a lateral acceleration is estimated and a warning is issued.

As described above, in this example, the passing speed in a curve ahead (Vp) is estimated from the speed limit (Vc) and the present vehicle speed (V), respectively weighted by a weighting function (Fpv). The drivers are normally aware of the speed limit of the road on which they drive, and are considered to drive bearing in mind the speed limit as the reference. By basing driving on the speed limit as the reference, the prediction of the vehicle speed becomes consistent with reality, so that a warning becomes suitable. Not only the speed limits but also various kinds of recommended speeds may be adopted. For example, it is preferred that recommended speeds are decided considering curves, and stored and used in place of the official speed limits.

The thus calculated lateral acceleration ayp is compared with the control reference value ap1*. This control reference value ap1* is decided in the same way as mentioned above, and is set at the same value with the first reference value a1* mentioned above. The * represents the value of F3, so that ap1* is varied by the value of the flag F3.

Figure 10:
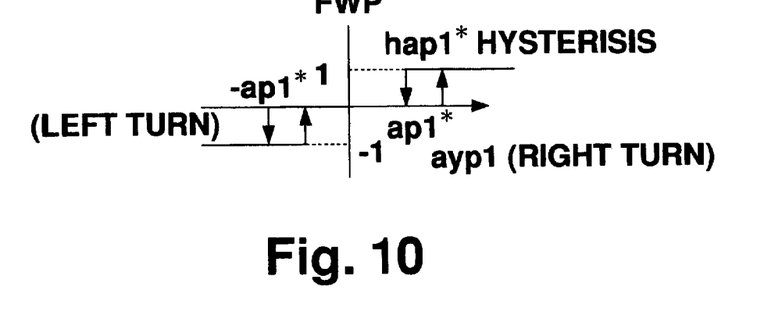
FIG. 10 is an explanatory diagram of control reference values.

As shown in FIG. 10, the control reference value ap1* can have two values ap1* and −ap1* having the positive and negative signs. When ayp is larger than ap1*, the flag FWP=1, and when ayp is smaller than −ap1*, the flag FWP=−1. When FWP=1, a voice message "Take care the road turns right." is given, and when FWP=−1, a voice message "Take care, the road turns left." Also in this case, hysterises hap1* are taken into account as shown in FIG. 10, for accurate decision with respect to warning.

Figure 11:
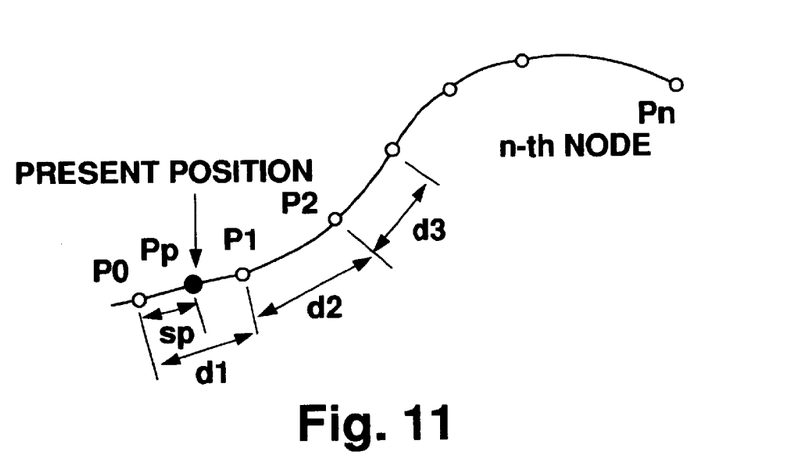
FIG. 11 is an explanatory diagram of points on a map.

For the above operation, data in the map data base 14 is prepared for specified points on the roads. For example, various items of data are stored for different points, such as P1, P2, P3, . . . spaced apart for specified distances (not necessarily at the same intervals) as shown in FIG. 11.

When data is read from the map data base 14 according to the map data base 14, reading starts with data at point P0 immediately before the present position at that moment. Data read from the map data base 14 contains the position, curvature, cant, longitudinal slope, and unsafe driving condition, or ineptitude flag at each point as shown in Table 2.

The processing unit 10, on reading data, calculates the distance d from each point to each previous point, and the distance s from each point to the P0 which immediately before the present position and stores these data. Furthermore, the distance from the present position is stored as dp and sp.

Figure 12:
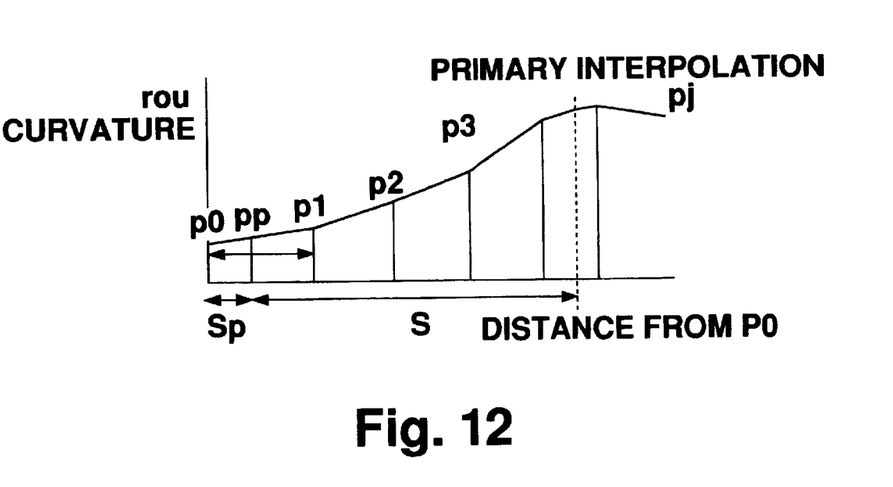
FIG. 12 is an explanatory diagram showing interpolation of data.

Table 3 is stored, and therefore data in this map can be used to calculate the lateral acceleration for various points ahead of the vehicle, making high-speed calculation possible. Rewriting data in the map as the vehicle moves on can be done relatively easily. Data for a position between points (the map points) may be prepared by linear interpolation. To be more specific, as shown in FIG. 12, data for a position between points can be interpolated from data at the preceding and succeeding points. FIG. 12 indicates how curvature data is calculated.

The friction coefficient $\mu$ of the road surface expressed in terms of values of wet and dry roads may be stored for various points

TABLE 2

| POSITION | | CURVATURE | CANT | LONGL. SLOPE | INEPTITUDE FLAG |
|---|---|---|---|---|---|
| P0 | (x0, y0) | rou 0 | cant 0 | inc 0 | flag 0 |
| P1 | (x1, y1) | rou 1 | cant 1 | inc 1 | flag 1 |
| P2 | (x2, y2) | rou 2 | cant 2 | inc 2 | flag 2 |
| P3 | (x3, y3) | rou 3 | cant 3 | inc 3 | flag 3 |
| Pn | (xn, yn) | rou n | cant n | inc n | flag n |

TABLE 3

| POSITION | | DISTANCE TO THE PREVIOUS POINT | DISTANCE FROM P0 | CURVATURE | CANT | LONGL. SLOPE | INEPTITUDE FLAG |
|---|---|---|---|---|---|---|---|
| P0 | (x0, y0) | | s0 | rou 0 | cant 0 | inc 0 | flag 0 |
| Pp | (xp, yp) | dp | sp | | | | |
| P1 | (x1, y1) | d1 | s1 | rou 1 | cant 1 | inc 1 | flag 1 |
| P2 | (x2, y2) | d2 | s2 | rou 2 | cant 2 | inc 2 | flag 2 |
| P3 | (x3, y3) | d3 | s3 | rou 3 | cant 3 | inc 3 | flag 3 |
| Pn | (xn, yn) | dn | sn | rou n | cant n | inc n | flag n |

The cant is + when the cant is left-side down, the curvature is + for a left-turn curve, and the longitudinal slope is + when the slope is uphill.

along the roads in the map data base 14. In this case, an arrangement may be made so that by detecting whether the road is wet or dry from the on/off condition of the wiper, a suitable friction coefficient $\mu$ is selected, by which a relatively accurate friction coefficient $\mu$ can be obtained.

Instead of storing the friction coefficient $\mu$ of each road, a table may be prepared in which the predetermined values are set according to whether the road is dry or wet and also according to the kind of the road, an asphalt road, for example, so that the friction coefficient $\mu$ is decided in consideration of the paved condition of the road (stored in the map data base 14). Moreover, the values of the friction coefficient $\mu$ of the road, on which the vehicle is driving, may be transmitted from the beacons along the road so that the driver can see the friction coefficient $\mu$ of the road by receiving a signal using communication equipment on the vehicle.

Furthermore, the friction coefficient $\mu$ of the road may be estimated from data on the behavior of the vehicle, such as skidding which occurred at the time of braking or acceleration in the past experience of the driver and/or vehicle. The friction coefficient $\mu$ of the road may be estimated from the self aligning torque (the torque acting on the ground contact area of the tire in the direction of reducing the slip angle when the tire is rotating at a slip angle).

If an accurate value of the friction coefficient $\mu$ of the road surface is obtained by these techniques, it becomes unnecessary to pay attention to the state of the unsafe driving condition flag related to the friction coefficient μ of the road surface.

Incidentally, the processing unit 10 is constituted by a computer including a CPU, RAM and ROM, and so on. Normally, the operations described above are achieved by executing an operation program stored in ROM. It is also preferable to store an operation program in an external recording medium, such as the map data base 14, and to install this program in the processing unit 14. In this case, an EEPROM which permits data to be rewritten may be adopted to record the operation program.

What is claimed is:

1. A vehicle driving condition prediction device comprising:
   a processor which determines a current position of the vehicle;
   a vehicle speed sensor which detects a speed of the vehicle;
   a data base containing data on curvatures of curves and data on road cants; and
   a processing unit which predicts lateral acceleration of the vehicle in an upcoming curve using said detected vehicle speed, said current position of the vehicle to obtain said curvature of said curve and said cant, and an assumed acceleration/deceleration pattern of a driver.

2. A vehicle driving condition prediction device according to claim 1, wherein said data base contains data on said curvatures of curves and data on road cants as data related to discrete points along the direction the vehicle is going to travel.

3. A vehicle driving condition prediction device according to claim 2, further comprising data on longitudinal slopes as data related to said discrete points.

4. A vehicle driving condition prediction device according to claim 1, wherein said processing unit predicts said vehicle speed travelling through a curve ahead as a function of time taking into consideration said detected vehicle speed and an assumed acceleration/deceleration pattern, and from said predicted vehicle speed, said processing unit predicts said lateral acceleration as a function of time.

5. The vehicle driving condition prediction device of claim 4, wherein said assumed acceleration/deceleration pattern simulates the deceleration pattern of an average driver under the present vehicle conditions and road to be traveled.

6. The vehicle driving condition prediction device of claim 4, wherein said assumed acceleration/deceleration pattern simulates the deceleration pattern of an individual driver under the present vehicle conditions and road to be traveled.

7. The vehicle driving condition prediction device of claim 4, wherein said assumed acceleration/deceleration pattern uses a plurality of parameters to simulate said assumed acceleration/deceleration pattern.

8. The vehicle driving condition prediction device of claim 7, wherein said plurality of parameters comprises five parameters.

9. The vehicle driving condition prediction device of claim 1, wherein said assumed acceleration/deceleration pattern simulates the deceleration pattern of an average driver under the present vehicle conditions and road to be traveled.

10. The vehicle driving condition prediction device of claim 1, wherein said assumed acceleration/deceleration pattern simulates the deceleration pattern of an individual driver under the present vehicle conditions and road to be traveled.

11. The vehicle driving condition prediction device of claim 1, wherein said assumed acceleration/deceleration pattern uses a plurality of parameters to express said assumed acceleration/deceleration pattern.

12. The vehicle driving condition prediction device of claim 11, wherein said plurality of parameters comprises five parameters.

13. A warning device for predicting a lateral acceleration of a vehicle and for producing a warning according to a predicted lateral acceleration, said warning device comprising:
    a first processing unit which determines a current position of the vehicle;
    a vehicle speed sensor which detects a speed of the vehicle;
    a data base containing data on curvatures of curves and road cants along the route to be traveled by the vehicle; and
    a second processing unit which predicts said lateral acceleration in a curve using said detected vehicle speed, said vehicle current position to obtain said curvature of said curve and said cant, and an assumed acceleration/deceleration pattern, said second processing unit deciding whether or not to produce a warning according to a prediction result.

14. A warning device according to claim 13, wherein said prediction of said lateral acceleration by said processing unit is to predict the maximum lateral acceleration in the curve which the vehicle enters, and when a predicted maximum lateral acceleration is higher than a predetermined reference value, a warning is given to the driver.

15. The vehicle driving condition prediction device of claim 13, wherein said assumed acceleration/deceleration pattern simulates the deceleration pattern of an average driver under the present vehicle conditions and road to be traveled.

16. The vehicle driving condition prediction device of claim 13, wherein said assumed acceleration/deceleration pattern simulates the deceleration pattern of an individual driver under the present vehicle conditions and road to be traveled.

17. The vehicle driving condition prediction device of claim 13, wherein said assumed acceleration/deceleration pattern uses a plurality of parameters to simulate said assumed acceleration/deceleration pattern.

18. The vehicle driving condition prediction device of claim 17, wherein said plurality of parameters comprises five parameters.

19. A recording medium used to predict lateral acceleration of a vehicle, the recording medium storing data on curvatures of curves, data on cants of roads as data related to discrete points lying in the road to be traveled by the vehicle, and data related to an assumed acceleration/deceleration pattern.

20. A recording medium according to claim 19, wherein said recording medium further stores longitudinal slope data as data related to said discrete points along the road.

21. A recording medium which stores a program for operating a vehicle driving condition prediction device to predict lateral acceleration of the vehicle passing though an upcoming curve, said recording medium comprising:

a program which causes said vehicle driving condition prediction device to retrieve a vehicle position from a processor which determines the position of the vehicle and a vehicle speed detected using a vehicle speed sensor, said program causing said vehicle driving condition prediction device to retrieve a curvature and cant of said upcoming curve from a data base using said vehicle position, and to predict a lateral acceleration of the vehicle traveling in said upcoming curve from said vehicle speed, curvature of the curve, road cant and an assumed acceleration/declaration pattern.

22. The vehicle driving condition prediction device of claim 21, wherein said assumed acceleration/deceleration pattern simulates the deceleration pattern of an average driver under the present vehicle conditions and road to be traveled.

23. The vehicle driving condition prediction device of claim 21, wherein said assumed acceleration/deceleration pattern simulates the deceleration pattern of an individual driver under the present vehicle conditions and road to be traveled.

24. The vehicle driving condition prediction device of claim 21, wherein said assumed acceleration/deceleration pattern uses a plurality of parameters to simulate said assumed acceleration/deceleration pattern.

25. The vehicle driving condition prediction device of claim 24, wherein said plurality of parameters comprises five parameters.

* * * * *